US010003243B2

(12) United States Patent
Kawaguchi et al.

(10) Patent No.: US 10,003,243 B2
(45) Date of Patent: Jun. 19, 2018

(54) ROTOR, METHOD OF MANUFACTURING THE ROTOR, AND ROTARY ELECTRIC MACHINE HAVING THE ROTOR

(71) Applicant: KYB Corporation, Tokyo (JP)

(72) Inventors: Takayuki Kawaguchi, Kanagawa (JP); Yoshiteru Kurokawa, Kanagawa (JP)

(73) Assignee: KYB Corporation, Tokyo (JP)

( * ) Notice: Subject to any disclaimer, the term of this patent is extended or adjusted under 35 U.S.C. 154(b) by 211 days.

(21) Appl. No.: 15/116,646

(22) PCT Filed: Jan. 23, 2015

(86) PCT No.: PCT/JP2015/051888
§ 371 (c)(1),
(2) Date: Aug. 4, 2016

(87) PCT Pub. No.: WO2015/162956
PCT Pub. Date: Oct. 29, 2015

(65) Prior Publication Data
US 2016/0352197 A1 Dec. 1, 2016

(30) Foreign Application Priority Data
Apr. 24, 2014 (JP) .................................. 2014-090355

(51) Int. Cl.
*H02K 1/28* (2006.01)
*H02K 1/27* (2006.01)
(Continued)

(52) U.S. Cl.
CPC ............. *H02K 15/03* (2013.01); *H02K 1/146* (2013.01); *H02K 1/2706* (2013.01); *H02K 1/278* (2013.01); *H02K 1/28* (2013.01)

(58) Field of Classification Search
CPC .......... H02K 1/146; H02K 1/27; H02K 1/274; H02K 1/2706; H02K 1/278; H02K 1/28; H02K 15/03; H02K 15/14
(Continued)

(56) References Cited

U.S. PATENT DOCUMENTS 4,742,259 A * 5/1988 Schaefer ................. H02K 1/278
228/173.1
5,121,605 A * 6/1992 Oda .......................... F01D 5/10
290/52
(Continued)

FOREIGN PATENT DOCUMENTS

JP 61-106050 * 5/1986 ............. H02K 21/08
JP H10-271725 A 10/1998
(Continued)

*Primary Examiner* — Burton Mullins
(74) *Attorney, Agent, or Firm* — Rabin & Berdo, P.C.

(57) ABSTRACT

A rotor 2 includes a rotor core 21 fixed to a rotation axis in such a manner that the rotor core 21 is rotatable integrally with the rotation axis, the rotor core 21 being configured to have a plurality of magnets 22 mounted thereon throughout a circumferential direction; a first rotor cover 24 that includes a first tubular portion 26, the first tubular portion 26 having a tubular shape configured to cover an outer circumference of one axial side of the rotor core 21; and a second rotor cover 25 that includes a second tubular portion 28, the second tubular portion 28 having a tubular shape configured to cover an outer circumference of the other axial side of the rotor core 21. An outer diameter of the first tubular portion 26 is configured to be larger than an inner diameter of the second tubular portion 28, and the first rotor cover 24 and the second rotor cover 25 are configured to be fixed to each other by press fitting to have the first tubular portion 26 arranged at an inner circumferential side of the second tubular portion 28.

9 Claims, 9 Drawing Sheets

(51) Int. Cl.
*H02K 15/03* (2006.01)
*H02K 1/14* (2006.01)

(58) Field of Classification Search
USPC ....... 310/89, 156.12, 156.28, 156.29; 29/598
See application file for complete search history.

(56) References Cited

U.S. PATENT DOCUMENTS

| | | | | |
|---|---|---|---|---|
| 5,140,210 | A * | 8/1992 | Shirakawa | H02K 1/278 310/156.28 |
| 7,561,015 | B2 * | 7/2009 | Vesci | H01F 7/0221 206/818 |
| 7,741,747 | B2 * | 6/2010 | Yamamura | H02K 1/278 310/156.01 |
| 7,830,058 | B2 * | 11/2010 | Maeda | H02K 1/2733 29/598 |
| 8,415,843 | B2 * | 4/2013 | Li | H02K 1/278 310/407 |
| 9,184,637 | B2 * | 11/2015 | Yamamura | H02K 1/278 |
| 9,472,984 | B2 * | 10/2016 | Taniguchi | H02K 1/2746 |
| 2002/0158544 | A1 * | 10/2002 | Bobay | H02K 1/2786 310/261.1 |
| 2010/0244607 | A1 * | 9/2010 | Fujimoto | H02K 1/278 310/156.21 |

FOREIGN PATENT DOCUMENTS

| | | |
|---|---|---|
| JP | H11-299149 A | 10/1999 |
| JP | 2012-070585 A | 4/2012 |
| JP | 2013-038858 A | 2/2013 |

* cited by examiner

ROTOR, METHOD OF MANUFACTURING THE ROTOR, AND ROTARY ELECTRIC MACHINE HAVING THE ROTOR

TECHNICAL FIELD

The present invention relates to a rotor, a method of manufacturing the rotor, and a rotary electric machine having the rotor.

BACKGROUND ART

JP 11-299149A discloses a rotor used in a rotary electric machine. This rotor includes a yoke having magnets mounted on an outer circumference thereof, and covers for covering the outer circumferential surfaces of the magnets. Each magnet has cutouts provided in circumferential ends thereof, and each cover has recesses provided in an opening edge thereof. The recesses of the covers are each locked into cutouts of adjacent magnets to restrict axial and circumferential movements of the covers.

SUMMARY OF INVENTION

With the foregoing conventional technique, in order to fix the covers in a circumferential direction with respect to the yoke, that is, in order to arrest a rotation of the covers, the magnets and the covers need to be processed before arranging the covers to cover the outer circumferences of the magnets. This increases the number of processes.

The present invention has been made in view of the foregoing technical problem. It is an object of the present invention to arrest a rotation of a rotor cover without increasing the number of processes.

According to one aspect of the present invention, a rotor includes a rotor core fixed to a rotation axis in such a manner that the rotor core is rotatable integrally with the rotation axis, the rotor core being configured to have a plurality of magnets mounted thereon throughout a circumferential direction; a first rotor cover that includes a first tubular portion, the first tubular portion having a tubular shape configured to cover an outer circumference of one axial side of the rotor core; and a second rotor cover that includes a second tubular portion, the second tubular portion having a tubular shape configured to cover an outer circumference of the other axial side of the rotor core. An outer diameter of the first tubular portion is configured to be larger than an inner diameter of the second tubular portion, and the first rotor cover and the second rotor cover are configured to be fixed to each other by press fitting to have the first tubular portion arranged at an inner circumferential side of the second tubular portion.

DESCRIPTION OF EMBODIMENTS

The following describes an embodiment of the present invention with reference to the attached drawings.

Figure 1:
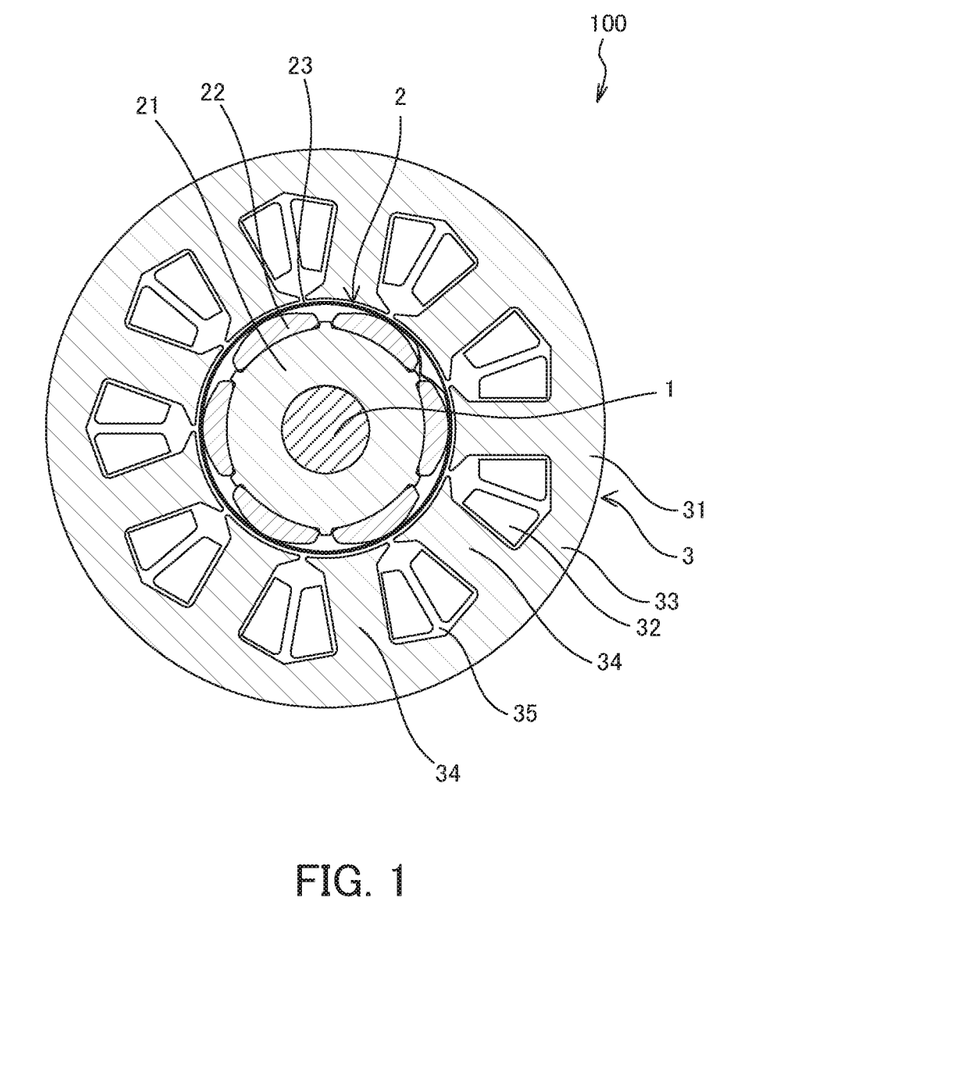
FIG. 1 is a cross-sectional view showing a rotary electric machine including a rotor according to an embodiment of the present invention.

FIG. 1 is a cross-sectional view showing a cross-section of a rotary electric machine 100 including a rotor 2 according to the present embodiment, taken along a direction perpendicular to a rotation axis.

The rotary electric machine 100 functions as at least one of a motor and an electric generator, and includes a shaft 1, a rotor 2, and a stator 3. The shaft 1 is rotatable and acts as the rotation axis. The rotor 2 is fixed integrally to the shaft 1. The stator 3 is disposed at an outer circumferential side of the rotor 2 with a predetermined gap interposed between the rotor 2 and the stator 3.

The rotor 2 includes a rotor core 21, permanent magnets 22, and a rotor cover 23. The rotor core 21 is fixed to an outer circumference of the shaft 1, and thus rotates together with the shaft 1. The permanent magnets 22 are arranged at equal intervals on an outer circumferential surface of the rotor core 21 throughout a circumferential direction. The rotor cover 23 accommodates therein the rotor core 21 having the permanent magnets 22 mounted thereon.

The stator 3 includes an annular stator core 31 and windings 32. The stator core 31 is disposed to encircle the rotor 2 with a predetermined gap interposed between the rotor 2 and the stator core 31. The windings 32 are wound and mounted on the stator core 31.

The stator core 31 includes an annular yoke 33, a plurality of teeth 34, and slots 35. The teeth 34 project radially inward from the yoke 33, and are circumferentially arranged at predetermined intervals. Each slot 35 is defined by adjacent teeth 34 to be located at an inner circumferential side of the yoke 33.

The windings 32 are wound around the teeth 34 of the stator core 31. Accordingly, a coil is formed on each tooth 34. The ends of the windings 32 are connected to an electrode (not shown) provided to the stator 3. When electric power is supplied to the coils via the electrode, the stator core 31 is magnetized, and the interaction between the stator core 31 and the permanent magnets 22 of the rotor 2 causes the rotor 2 to rotate with the shaft 1 acting as the axis.

Figure 2:
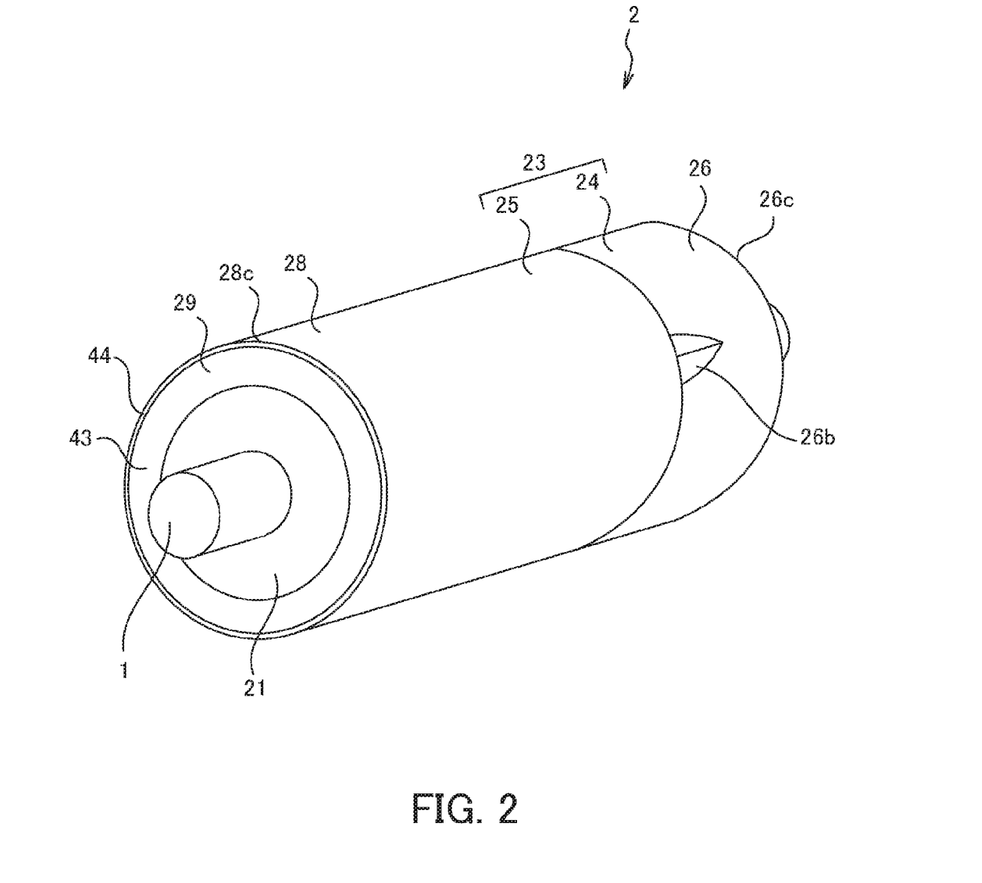
FIG. 2 is a perspective view showing the rotor according to the embodiment of the present invention.
Figure 3:
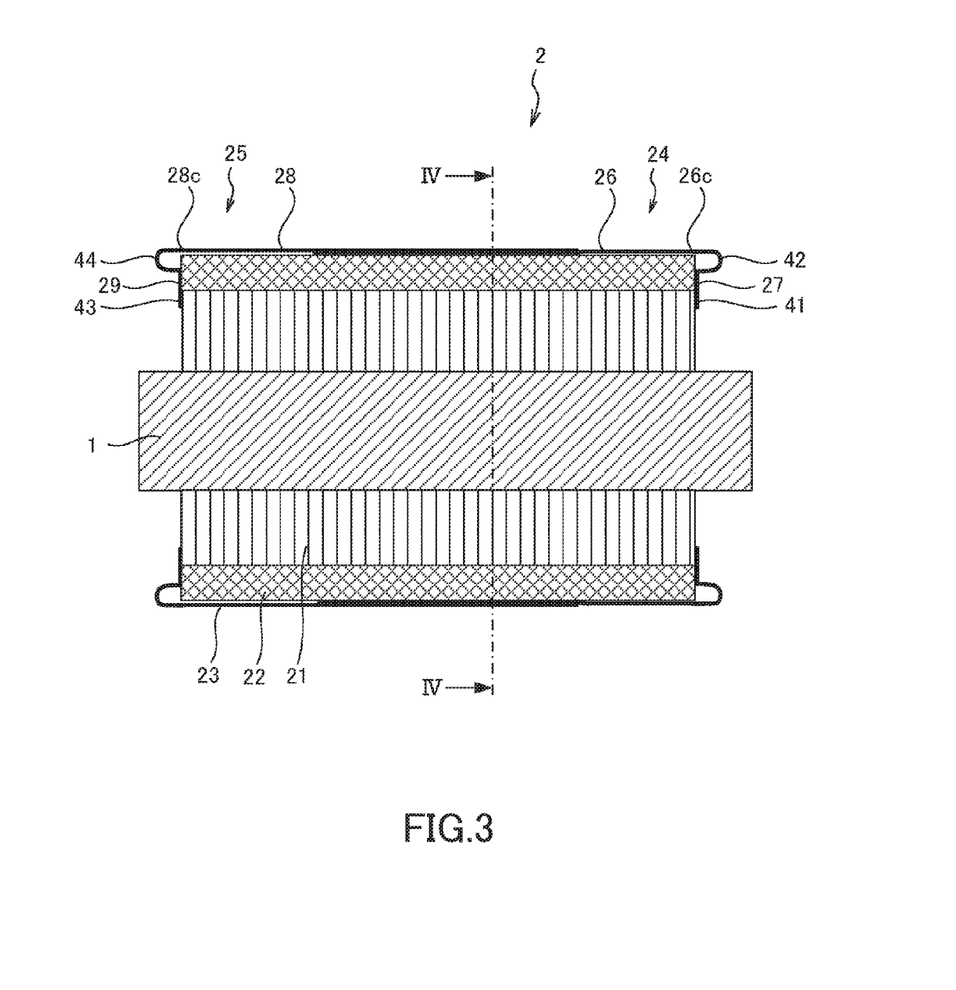
FIG. 3 is a cross-sectional view showing a cross-section of the rotor taken along a plane including a rotation axis of a shaft.
Figure 4:
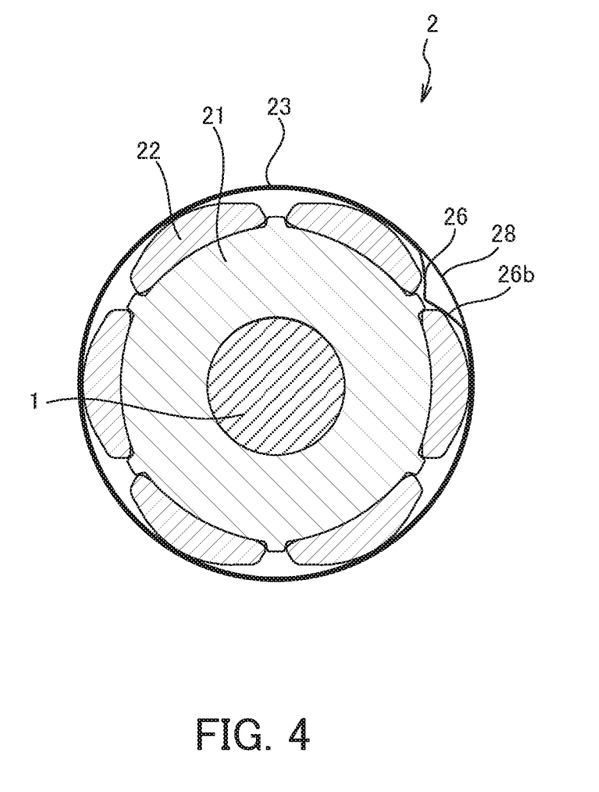
FIG. 4 is a cross-sectional view showing a cross-section taken along the line IV-IV of FIG. 3.

FIG. 2 is a perspective view showing the rotor 2 according to the present embodiment. FIG. 3 is a cross-sectional view showing a cross-section of the rotor 2 taken along a plane including the rotation axis of the shaft 1. FIG. 4 is a cross-sectional view showing a cross-section taken along the line IV-IV of FIG. 3.

The rotor cover 23 is a tubular member made of non-magnetic stainless steel for accommodating therein the rotor core 21 having the permanent magnets 22 mounted thereon. The rotor cover 23 is axially divided into two parts serving as its components: a first rotor cover 24 and a second rotor cover 25. The first rotor cover 24 and the second rotor cover 25 are arranged to cover the rotor core 21 from both axial ends of the rotor core 21, and then partially press fit to each other. As a result, they are integrated as the rotor cover 23.

As shown in FIG. 3, the first rotor cover 24 includes a first tubular portion 26 and a first contact portion 27. The first tubular portion 26 has a tubular shape, and covers an outer circumference of one axial side (the right side in FIG. 3) of the rotor core 21. The first contact portion 27 comes into contact with an end of one axial side of the rotor core 21. The second rotor cover 25 includes a second tubular portion 28 and a second contact portion 29. The second tubular portion 28 has a tubular shape, and covers an outer circumference of the other axial side (the left side in FIG. 3) of the rotor core 21. The second contact portion 29 comes into contact with an end of the other axial side of the rotor core 21.

The first tubular portion 26 and the second tubular portion 28 not only have the same inner diameter as the outer diameter, but also have the same axial length. The axial lengths of the first tubular portion 26 and the second tubular portion 28 are set such that a sum thereof is longer than an axial length of the rotor core 21. Therefore, a part of the first tubular portion 26 and a part of the second tubular portion 28 are arranged to overlap on an outer circumference of the rotor core 21.

The first contact portion 27 includes a first annular plate portion 41 and a first connection portion 42. The first annular plate portion 41 has an annular shape and a surface perpendicular to an axial direction. The first connection portion 42 is connected to a first connection side end 26c of the first tubular portion 26 and an end of the first contact portion 27, and axially projects relative to the first connection side end 26c and the end of the first contact portion 27. The first connection side end 26c is opposite to a press fit side end 26a of the first tubular portion 26 to be press fit into the second tubular portion 28. The second contact portion 29 includes a second annular plate portion 43 and a second connection portion 44. The second annular plate portion 43 has an annular shape and a surface perpendicular to the axial direction. The second connection portion 44 is connected to a second connection side end 28c of the second tubular portion 28 and an end of the second contact portion 29, and axially projects relative to the second connection side end 28c and the end of the second contact portion 29. The second connection side end 28c is opposite to a press fit side end 28a of the second tubular portion 28 to be press fit onto the first tubular portion 26.

An outer circumference of the first annular plate portion 41 is connected to the first connection portion 42, and an inner diameter of the first annular plate portion 41 is set to be smaller than an outer diameter of the rotor core 21. An outer circumference of the second annular plate portion 43 is connected to the second connection portion 44, and an inner diameter of the second annular plate portion 43 is set to be smaller than the outer diameter of the rotor core 21. As such, the first annular plate portion 41 and the first connection portion 42, as well as the second annular plate portion 43 and the second connection portion 44, radially extend over the permanent magnets 22 and the rotor core 21.

The first connection portion 42 is formed to axially project throughout an entire circumferential direction of the first tubular portion 26, thereby forming an annular projection at an end of the first tubular portion 26. The second connection portion 44 is formed to axially project throughout an entire circumferential direction of the second tubular portion 28, thereby forming an annular projection at an end of the second tubular portion 28.

As described above, the first connection portion 42 is formed as the annular projection that axially projects from the end of the first tubular portion 26. This enables one axial end of the rotor core 21 to abut the first annular plate portion 41.

Similarly to the first connection portion 42, the second connection portion 44 is formed as the annular projection that axially projects from the end of the second tubular portion 28. This enables the other axial end of the rotor core 21 to abut the second annular plate portion 43.

Figure 5A:
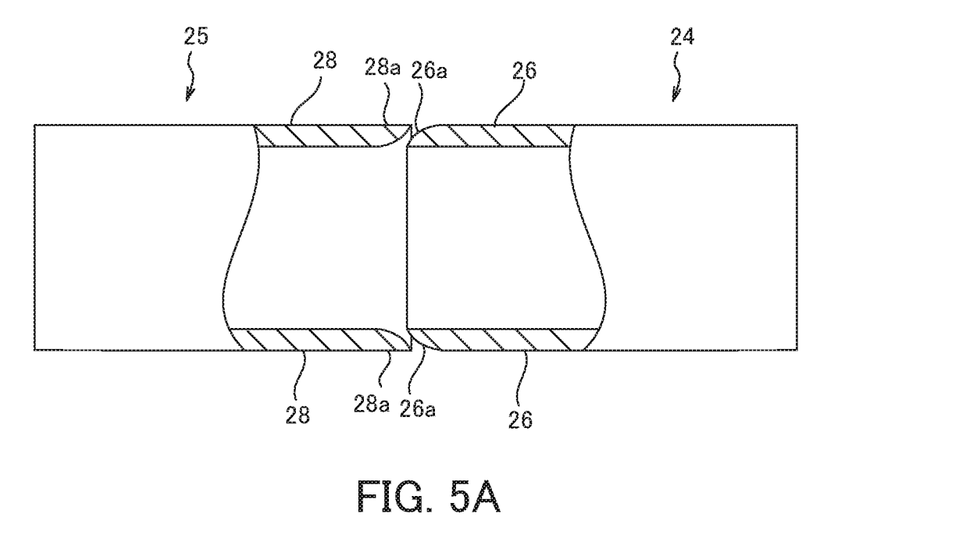
FIG. 5A is a partial cross-sectional view showing the shapes of end faces of rotor covers.

The first tubular portion 26 and the second tubular portion 28 have the same inner diameter as the outer diameter. Therefore, as shown in FIG. 4, in a region where the first tubular portion 26 and the second tubular portion 28 overlap, a deformed portion 26b is formed as the first tubular portion 26 deformed by being press-fitted into an inner circumferential side of the second tubular portion 28. FIG. 5A is an enlarged partial cross-sectional view showing the shapes of end faces of the press fit sides of the first tubular portion 26 and the second tubular portion 28. Note that FIG. 5A only shows a cross-section of the first tubular portion 26 and the second tubular portion 28 in the vicinity of their ends, and depicts the first tubular portion 26 and the second tubular portion 28 with increased wall thicknesses to clarify the shapes of the end faces.

The press fit side end 26a of the first tubular portion 26 has a trimmed shape formed by a flange up forming. That is, the press fit side end 26a of the first tubular portion 26 is formed so as to have an outer diameter smaller than that of the first connection side end 26c opposite to the press fit side end 26a and decrease in the outer diameter toward a tip thereof. The press fit side end 28a of the second tubular portion 28 has a trimmed shape formed by a pinch trimming. That is, the press fit side end 28a of the second tubular portion 28 is formed so as to have an inner diameter larger than that of the second connection side end 28c opposite to the press fit side end 28a and increase in the inner diameter toward a tip thereof. Therefore, bringing the first tubular portion 26 formed by the flange up forming and the second tubular portion 28 formed by the pinch trimming close to each other in the axial direction causes the first tubular portion 26 to be press fit into the inner circumferential side of the second tubular portion 28. In this process, the deformed portion 26b is formed as the stress generated in the first tubular portion 26 concentrates at the weakest space between magnets and the like.

At this time, as shown in FIG. 4, due to the arrangement of the permanent magnets 22 at an inner circumferential side of the first tubular portion 26, the first tubular portion 26 does not deform toward top portions of the permanent magnet 22, but deforms radially inward toward a gap defined between circumferentially adjacent permanent magnets 22. As a result, the first rotor cover 24 and the second rotor cover 25 are fixed to each other by press fitting, and the deformed portion 26b functions to prevent a circumferential rotation of the rotor cover 23.

Although the present embodiment describes an example case in which one deformed portion 26b is formed, two or more deformed portions 26b may be formed. When two or more deformed portions 26b are formed, each deformed portion 26b is formed in a gap defined between adjacent permanent magnets 22.

Figure 5B:
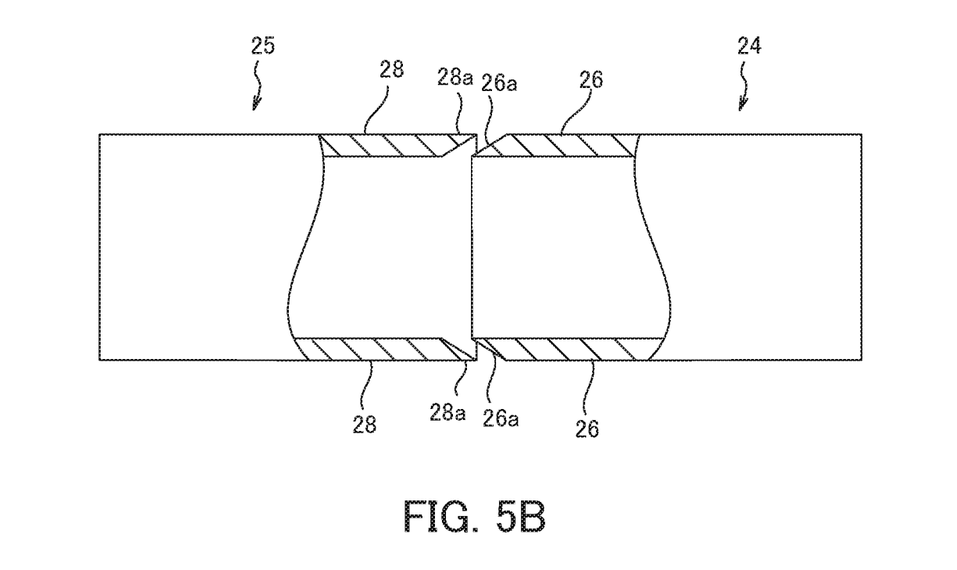
FIG. 5B is a partial cross-sectional view showing a modification example of the shapes of end faces of rotor covers.

Although the press fit side end 26a of the first tubular portion 26 and the press fit side end 28a of the second tubular portion 28 are each formed to have a curved surface that changes in diameter toward the tip in the present embodiment, they may each be formed into a tapered shape so as to change in diameter toward the tip at a constant rate as shown in FIG. 5B.

A method of manufacturing the rotor 2 will now be described.

First, the plurality of permanent magnets 22 are mounted on the outer circumferential surface of the rotor core 21. The permanent magnets 22 are mounted using an adhesive or the like so as to be arranged at equal intervals throughout the circumferential direction.

Figure 6:
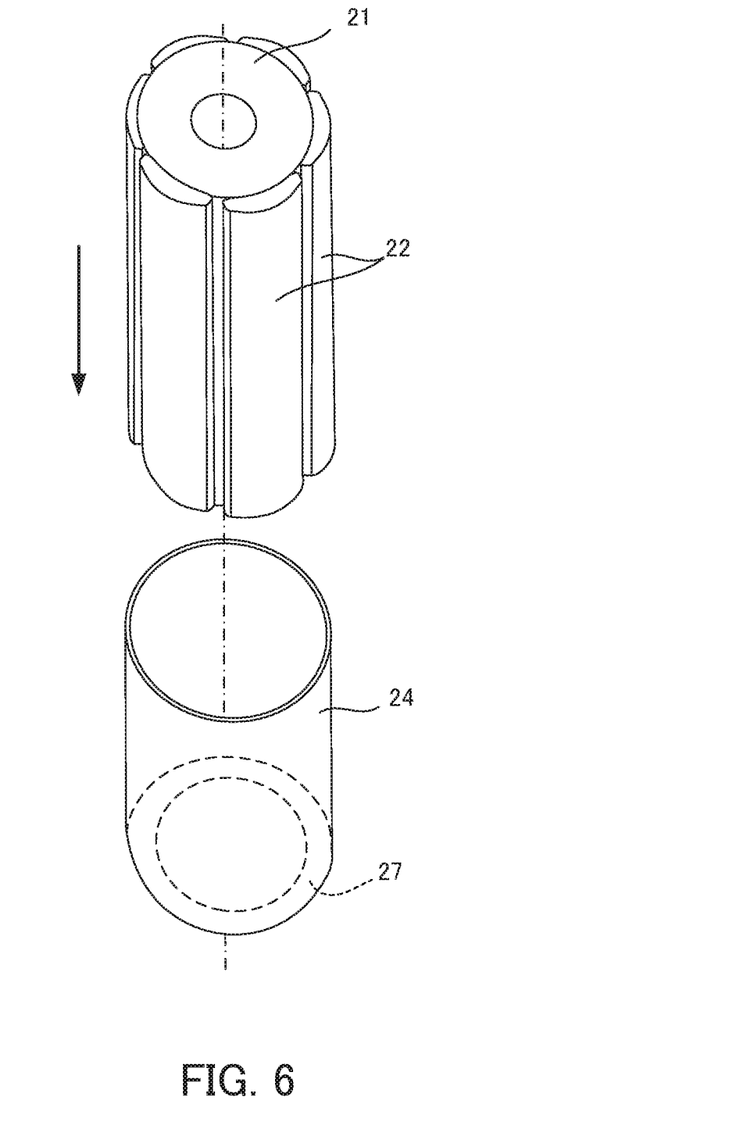
FIG. 6 illustrates a process of manufacturing the rotor.

Then, as shown in FIG. 6, the first rotor cover 24 is arranged to cover the outer circumference of the rotor core 21 having the permanent magnets 22 mounted thereon, from one axial end side of the rotor core 21. The first rotor cover 24 is fit until the first contact portion 27 comes into contact with one axial end of the rotor core 21.

Figure 7:
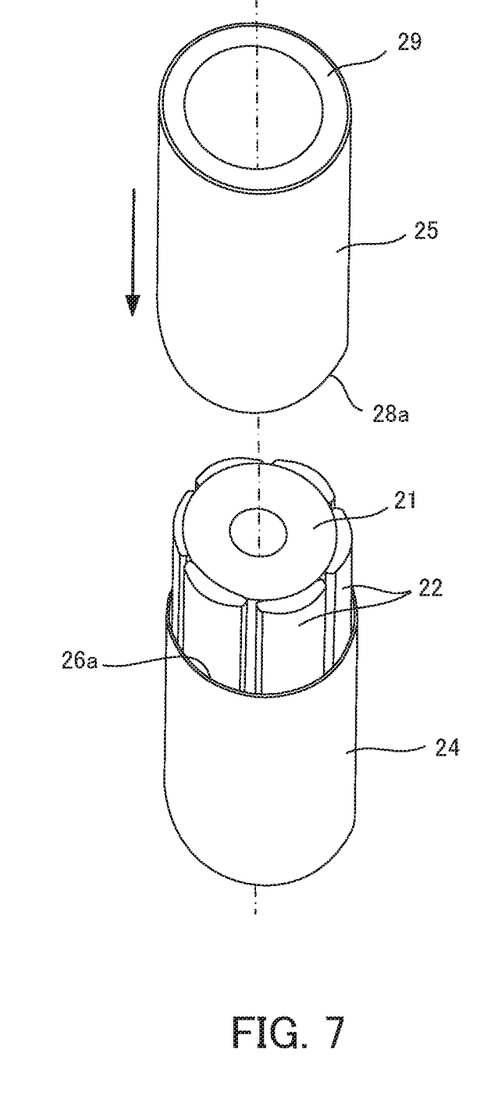
FIG. 7 illustrates a process of manufacturing the rotor.

Subsequently, as shown in FIG. 7, the second rotor cover 25 is arranged to cover the outer circumference of the rotor core 21 from the other axial end side of the rotor 21. When the press fit side end 28a of the second rotor cover 25 reaches the press fit side end 26a of the first rotor cover 24, the second rotor cover 25 is further pushed to be press fit onto the first rotor cover 24.

Consequently, the first rotor cover 24 having the press fit side end 26a formed into the flange up forming slides into an inner circumferential side of the second rotor cover 25 having the press fit side end 28a formed into the pinch trimming deforms while deforming. The second rotor cover 25 is press fit until the second contact portion 29 comes into contact with the other axial end of the rotor core 21.

Thereafter, the shaft 1 is inserted into the center of the rotor core 21. As a result, the rotor 2 having the shaft 1 is completed as shown in FIG. 2.

The foregoing embodiment achieves the following effects.

The first rotor cover 24 and the second rotor cover 25 are fixed to each other by press fitting to have the first tubular portion 26 arranged at the inner circumferential side of the second tubular portion 28. This allows the first tubular portion 26 at the inner circumferential side to deform radially inward. Consequently, the deformed portion 26b comes into contact with the permanent magnets 22 mounted on the outer circumference of the rotor core 21 to fix the rotor cover 23 in the circumferential direction. Therefore, a rotation of the rotor cover 23 can be arrested without processing the permanent magnets 22, the first rotor cover 24, and the second rotor cover 25 in advance, that is, without increasing the number of processes. On the other hand, it may be possible to fix the first rotor cover 24 and the second rotor cover 25 in the axial, radial, and circumferential directions using a filler made of resin material. However, in this case, material cost could increase because the filler faces a time constraint due to its shelf life, and durability of the filler could also become an issue depending on the period of its use. In contrast, the present embodiment can lower the cost as it does not require the filler.

As the first tubular portion 26 of the first rotor cover 24 and the second tubular portion 28 of the second rotor cover 25 have the same inner diameter as the outer diameter, the first rotor cover 24 and the second rotor cover 25 can be manufactured from a material having an equal tube diameter. Therefore, the cost can be lowered. As the first tubular portion 26 of the first rotor cover 24 and the second tubular portion 28 of the second rotor cover 25 have the same axial length, materials having an equal dimension can be commonly used as the first rotor cover 24 and the second rotor cover 25. Therefore, the cost can be further lowered.

As it is sufficient for the first tubular portion 26 of the first rotor cover 24 and the second tubular portion 28 of the second rotor cover 25 to partially overlap, the rotor 2 may be changed in a lengthwise direction by an allowable amount. Therefore, materials for the first rotor cover 24 and the second rotor cover 25 can be more commonly used.

As the press fit side end 26a of the first tubular portion 26 is formed into the flange up forming and the press fit side end 28a of the second tubular portion 28 is formed into the pinch trimming, the first tubular portion 26 can be guided to slide into the inner circumferential side of the second tubular portion 28 in a more reliable manner when press fitting the second rotor cover 25 onto the first rotor cover 24. This can prevent a situation where both of the first rotor cover 24 and the second rotor cover 25 deform, and improve the yield rate.

The first contact portion 27 includes the first annular plate portion 41 and the first connection portion 42. The first annular plate portion 41 has an annular shape and a surface perpendicular to the axial direction. The first connection portion 42 is connected to the first connection side end 26c of the first tubular portion 26 and an end of the first contact portion 27, and axially projects relative to the first connection side end 26c and the end of the first contact portion 27. The second contact portion 29 includes the second annular plate portion 43 and the second connection portion 44. The second annular plate portion 43 has an annular shape and a surface perpendicular to the axial direction. The second connection portion 44 is connected to the second connection side end 28c of the second tubular portion 28 and an end of the second contact portion 29, and axially projects relative to the second connection side end 28c and the end of the second contact portion 29. Therefore, the axial length of the permanent magnets 22 can be extended to the limit. As the axial ends of the rotor core 21 can abut the first annular plate portion 41 and the second annular plate portion 43, the axial dimension of the rotor core 21 can be reduced.

As the rotor core 21 is first covered by the first rotor cover 24 and then covered by the second rotor cover 25, the first tubular portion 26 of the first rotor cover 24 deforms radially while it is stationary in the axial direction. This can prevent the deformed portion 26b from moving in the axial direction and coming into contact with the permanent magnets 22 during the formation process of the deformed portion 26b.

The embodiments of the present invention described above are merely illustration of some application examples of the present invention and not of the nature to limit the technical scope of the present invention to the specific constructions of the above embodiments.

For example, the foregoing embodiment has described an example case in which the first tubular portion 26 and the second tubular portion 28 have the same inner diameter as the outer diameter. However, in a case where the outer diameter of the first tubular portion 26 is larger than the inner diameter of the second tubular portion 28, the first tubular portion 26 and the second tubular portion 28 may be different from each other in at least one of inner diameter and outer diameter.

The foregoing embodiment has described an example case in which the press fit side end 26a of the first tubular portion 26 is formed into the flange up forming and the press fit side end 28a of the second tubular portion 28 is formed into the pinch trimming. Alternatively, only one of the press fit side end 26a and the press fit side end 28a may be formed into one of such trimmed shapes. In a case where the first tubular portion 26 and the second tubular portion 28 are different from each other in at least one of inner diameter and outer diameter, such trimmed shapes may be omitted.

Figure 8:
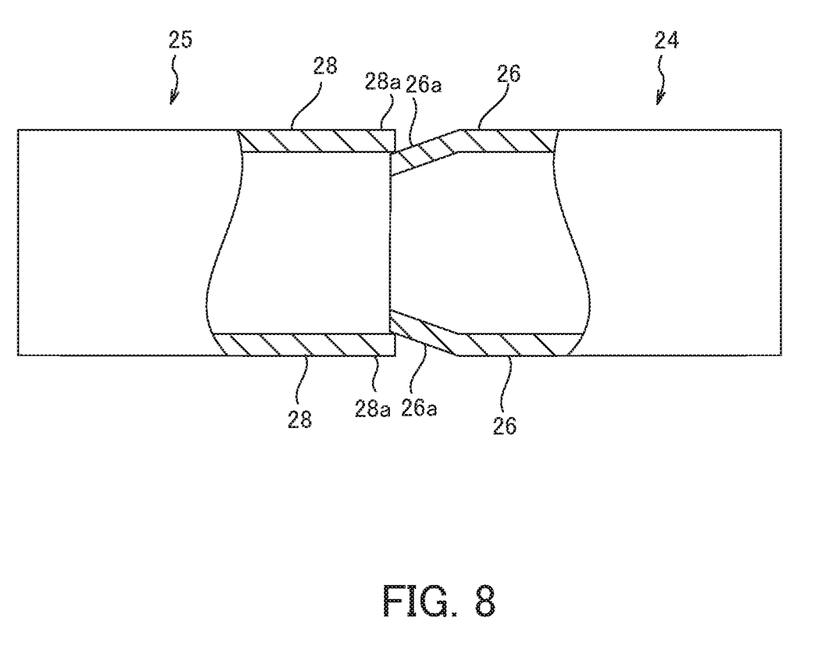
FIG. 8 is an enlarged cross-sectional view showing a modification example of the shapes of end faces of rotor covers.

For example, in a case where the press fit side end 26a of the first tubular portion 26 is formed into a tapered shape so as to decrease in both inner diameter and outer diameter toward the tip as shown in FIG. 8, the press fit side end 28a of the second tubular portion 28 need not be formed into the aforementioned trimmed shape. In this case, as long as the outer diameter of the press fit side end 26a of the first tubular portion 26 is smaller than the inner diameter of the press fit side end 28a of the second tubular portion 28, bringing the first tubular portion 26 and the second tubular portion 28 close to each other in the axial direction causes the first tubular portion 26 to be press fit into the inner circumferential side of the second tubular portion 28, thereby forming the deformed portion 26b.

In the foregoing embodiment, the press fit side ends 26a and 28a of the first tubular portion 26 and the second tubular portion 28 are processed in advance to press fit the first tubular portion 26 and the second tubular portion 28 to each other. However, the portions to be processed are not limited to the press fit side ends 26a and 28a. The entirety of the first tubular portion 26 and the entirety of the second tubular portion 28 may be processed. In particular, as long as the outer diameter of the first tubular portion 26 is larger than the inner diameter of the second tubular portion 28 in the region where the first tubular portion 26 and the second tubular portion 28 overlap, the deformed portion 26b is formed.

Figure 9:
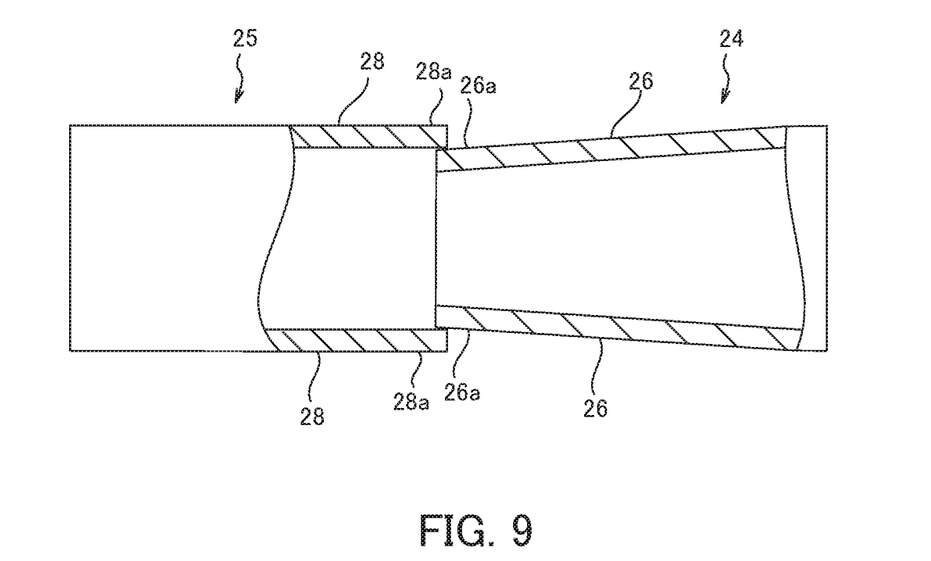
FIG. 9 is an enlarged cross-sectional view showing a modification example of the shapes of end faces of rotor covers.

For example, in a case where the entirety of the first tubular portion 26 is formed into a tapered shape so as to decrease in both inner diameter and outer diameter toward the press fit side end 26a as shown in FIG. 9, as long as the outer diameter of the press fit side end 26a of the first tubular portion 26 is smaller than the inner diameter of the press fit side end 28a of the second tubular portion 28, bringing the first tubular portion 26 and the second tubular portion 28 close to each other in the axial direction causes the first tubular portion 26 to be press fit into the inner circumferential side of the second tubular portion 28, thereby forming the deformed portion 26b.

The foregoing embodiment has described an example case in which the first tubular portion 26 and the second tubular portion 28 have the same axial length. Alternatively, the first tubular portion 26 and the second tubular portion 28 may not have the same axial length. In a case where the axial length of the second tubular portion 28 is equal to or longer than the axial length of the first tubular portion 26, the second tubular portion 28 and the first tubular portion 26 may be fixed to each other by press fitting in such a manner that the second tubular portion 28 covers the entire outer circumferential surface of the first tubular portion 26. This can make the deformed portion 26b of the first tubular portion 26 invisible from outside.

The foregoing embodiment has described an example case in which the first contact portion 27 includes the first connection portion 42 and the second contact portion 29 includes the second connection portion 44. The first connection portion 42 is connected to the first connection side end 26c of the first tubular portion 26 and an end of the first contact portion 27, and axially projects relative to the first connection side end 26c and the end of the first contact portion 27. The second connection portion 44 is connected to the second connection side end 28c of the second tubular portion 28 and an end of the second contact portion 29, and axially projects relative to the second connection side end 28c and the end of the second contact portion 29. Alternatively, at least one of the first connection portion 42 and the second connection portion 44 may not be provided. In a case where the first connection portion 42 and the second connection portion 44 are not provided, the first tubular portion 26 and the first annular plate portion 41 are connected by a curved surface formed by inwardly drawing the first tubular portion 26, and the second tubular portion 28 and the second annular plate portion 43 are connected by a curved surface formed by inwardly drawing the second tubular portion 28. In this case, the corners of the permanent magnets 22, specifically, the outermost circumferential parts and axial end faces of the permanent magnets 22 come into contact with the curved surfaces.

In the foregoing embodiment, the first annular plate portion 41 of the first rotor cover 24 and the second annular plate portion 43 of the second rotor cover 25 are arranged to completely cover the permanent magnets 22. Alternatively, they may be arranged to allow a part of the permanent magnets 22 to be exposed, as long as fragments of the permanent magnets 22 do not scatter when the permanent magnets 22 break.

In the foregoing embodiment, the first rotor cover 24 includes the first tubular portion 26 and the first contact portion 27. Alternatively, the first tubular portion 26 and the first contact portion 27 may be provided in separate members, or the first contact portion 27 may not be provided. Similarly, in the foregoing embodiment, the second rotor cover 25 includes the second tubular portion 28 and the second contact portion 29. Alternatively, the second tubular portion 28 and the second contact portion 29 may be provided in separate members, or the second contact portion 29 may not be provided.

In the foregoing embodiment, the two rotor covers, i.e., the first rotor cover 24 and the second rotor cover 25 are arranged to cover the outer circumference of the rotor core 21. Alternatively, each of the rotor covers 24, 25 may be axially divided into a plurality of covers serving as its components. In this case, three or more tubular covers are arranged to cover the outer circumference of the rotor core 21, and fixed to one another by press fitting.

The foregoing embodiment has described an example case in which the rotor core 21 is first covered by the first rotor cover 24 and then covered by the second rotor cover 25. Alternatively, the rotor core 21 may be first covered by the second rotor cover 25 and then covered by the first rotor cover 24, or the rotor core 21 may be covered by the first rotor cover 24 and the second rotor cover 25 simultaneously.

The rotor cover 23 is made of non-magnetic stainless steel in the description of the foregoing embodiment. Alternatively, the rotor cover 23 may be made of other non-magnetic metals, such as aluminum.

The present application claims a priority based on Japanese Patent Application No. 2014-90355 filed with the Japan Patent Office on Apr. 24, 2014, all the contents of which are hereby incorporated by reference.

The invention claimed is:
1. A rotor, comprising:
a rotor core fixed to a rotation axis in such a manner that the rotor core is rotatable integrally with the rotation axis, the rotor core being configured to have a plurality of magnets mounted thereon throughout a circumferential direction;
a first rotor cover that includes a first tubular portion, the first tubular portion having a tubular shape configured to cover an outer circumference of one axial side of the rotor core; and
a second rotor cover that includes a second tubular portion, the second tubular portion having a tubular shape configured to cover an outer circumference of the other axial side of the rotor core, wherein:

an outer diameter of the first tubular portion is configured to be larger than an inner diameter of the second tubular portion, and the first rotor cover and the second rotor cover are configured to be fixed to each other by press fitting to have the first tubular portion arranged at an inner circumferential side of the second tubular portion.

2. The rotor according to claim 1, further comprising:
a first contact portion configured to come into contact with an end of the one axial side of the rotor core; and
a second contact portion configured to come into contact with an end of the other axial side of the rotor core.

3. The rotor according to claim 2, wherein:
the first tubular portion is configured to be formed integrally with the first contact portion, and
the second tubular portion is configured to be formed integrally with the second contact portion.

4. The rotor according to claim 2, wherein:
the first contact portion includes:
a first annular plate portion that has an annular shape and a surface perpendicular to an axial direction; and
a first connection portion connected to a first connection side end of the first tubular portion and an end of the first contact portion, the first connection portion axially projecting relative to the first connection side end and the end of the first contact portion, the first connection side end being opposite to a press fit side end of the first tubular portion to be press fit into the second tubular portion, and
the second contact portion includes:
a second annular plate portion that has an annular shape and a surface perpendicular to the axial direction; and
a second connection portion connected to a second connection side end of the second tubular portion and an end of the second contact portion, the second connection portion axially projecting relative to the second connection side end and the end of the second contact portion, the second connection side end being opposite to a press fit side end of the second tubular portion to be press fit onto the first tubular portion.

5. The rotor according to claim 1, wherein
the press fit side end of the first tubular portion is configured to be formed so as to decrease in outer diameter toward a tip thereof as opposed to the first connection side end opposite to the press fit side end.

6. The rotor according to claim 1, wherein
the press fit side end of the second tubular portion is configured to be formed so as to increase in inner diameter toward a tip thereof as opposed to the second connection side end opposite to the press fit side end.

7. The rotor according to claim 1, wherein
the first rotor cover and the second rotor cover are configured to be fixed to each other by press fitting in such a manner that the second tubular portion covers an entire outer circumferential surface of the first tubular portion.

8. A rotary electric machine, comprising:
the rotor according to claim 1; and
a stator configured to be disposed at an outer circumferential side of the rotor with a predetermined gap interposed between the rotor and the stator.

9. A method of manufacturing a rotor including a rotor core fixed to a rotation axis in such a manner that the rotor core is rotatable integrally with the rotation axis, the rotor core having a plurality of magnets mounted thereon throughout a circumferential direction, the method comprising:
covering a first rotor cover that includes a first tubular portion and a first contact portion to the rotor core from one axial side of the rotor core, the first tubular portion having a tubular shape to cover an outer circumference of the one axial side of the rotor core, and the first contact portion coming into contact with an end of the one axial side of the rotor core;
covering a second rotor cover that includes a second tubular portion and a second contact portion to the rotor core from the other axial side of the rotor core, the second tubular portion having a tubular shape to cover an outer circumference of the other axial side of the rotor core, and the second contact portion coming into contact with an end of the other axial side of the rotor core; and
press fitting the second rotor cover onto the first rotor cover to have the first tubular portion arranged at an inner circumferential side of the second tubular portion.

* * * * *